(12) United States Patent
Chand et al.

(10) Patent No.: US 9,172,764 B2
(45) Date of Patent: Oct. 27, 2015

(54) GENERATING A PLATFORM FOR SOCIAL INTERACTION

(71) Applicants: Ashootosh Chand, Bangalore (IN); Bharathi Shekar, Bangalore (IN); Yash Kotak, Bangalore (IN); Ankit Suchanti, Bangalore (IN)

(72) Inventors: Ashootosh Chand, Bangalore (IN); Bharathi Shekar, Bangalore (IN); Yash Kotak, Bangalore (IN); Ankit Suchanti, Bangalore (IN)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/198,503

(22) Filed: Mar. 5, 2014

(65) Prior Publication Data
US 2015/0256633 A1    Sep. 10, 2015

(51) Int. Cl.
G06K 9/00 (2006.01)
H04L 29/08 (2006.01)

(52) U.S. Cl.
CPC ............ *H04L 67/22* (2013.01); *G06K 9/00536* (2013.01); *H04L 67/10* (2013.01)

(58) Field of Classification Search
None
See application file for complete search history.

(56) References Cited

U.S. PATENT DOCUMENTS

2011/0143811 A1*  6/2011  Rodriguez ............... 455/556.1
2012/0084731 A1*  4/2012  Filman et al. ............ 715/838

* cited by examiner

*Primary Examiner* — Phuoc Tran
(74) *Attorney, Agent, or Firm* — Patent Law Works LLP

(57) ABSTRACT

The disclosure includes a system and method for identifying discussion groups related to a video that a user would find to be interesting. A recognition application receives a captured image from a user, identifies an indexed image that matches the captured image, identifies a timestamp for the indexed image, determines a segment in the video that encompasses the timestamp, determines whether the user is interested in the segment of the video based on the timestamp and a user profile and provides suggested discussion groups to the user that are ranked based on what the user is interested in.

20 Claims, 7 Drawing Sheets

GENERATING A PLATFORM FOR SOCIAL INTERACTION

BACKGROUND OF THE INVENTION

1. Field of the Invention

The specification relates to creating a platform for social interaction using visual search technology. In particular, the specification relates to a system and method for identifying discussion groups related to a video that a user would find to be interesting.

2. Description of the Background Art

Users consume media from a variety of sources, for example, broadcast television and streaming movies from a website. Services currently exist to track users' viewing habits; however, the services are limited to a single source. For example, a first website that provides streaming services can track a user's consumption of media from the first website, but the first website cannot know the user's activities on other websites. As a result, the tracking information is incomplete.

Social opportunities exist for discussing video content; however, with so many topics related to a video, it can be difficult to find a group that is addressing what the viewer perceives as being the interesting part of the movie. For example, it may be trivial to find people discussing a movie, but much more difficult to locate people discussing a particular scene.

SUMMARY OF THE INVENTION

The disclosure includes a system and method for identifying discussion groups related to a video that a user would find to be interesting. In one embodiment, the system is configured to receive a captured image from a user, identify an indexed image that matches the captured image, identify a timestamp for the indexed image, determine a segment in the video that encompasses the timestamp, determine whether the first user is interested in the segment of the video based on the timestamp and a user profile and provide suggested discussion groups to the user that are ranked based on what the first user is interested in.

Other aspects include corresponding methods, systems, apparatuses and computer program products for these and other innovative aspects.

The specification advantageously describes technology for directing users who captured images from a video to a social platform. The social platform enables users to selectively socialize on different snippets of a video and provides targeted advertising, and therefore provides flexibility for both the users and the advertisers.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
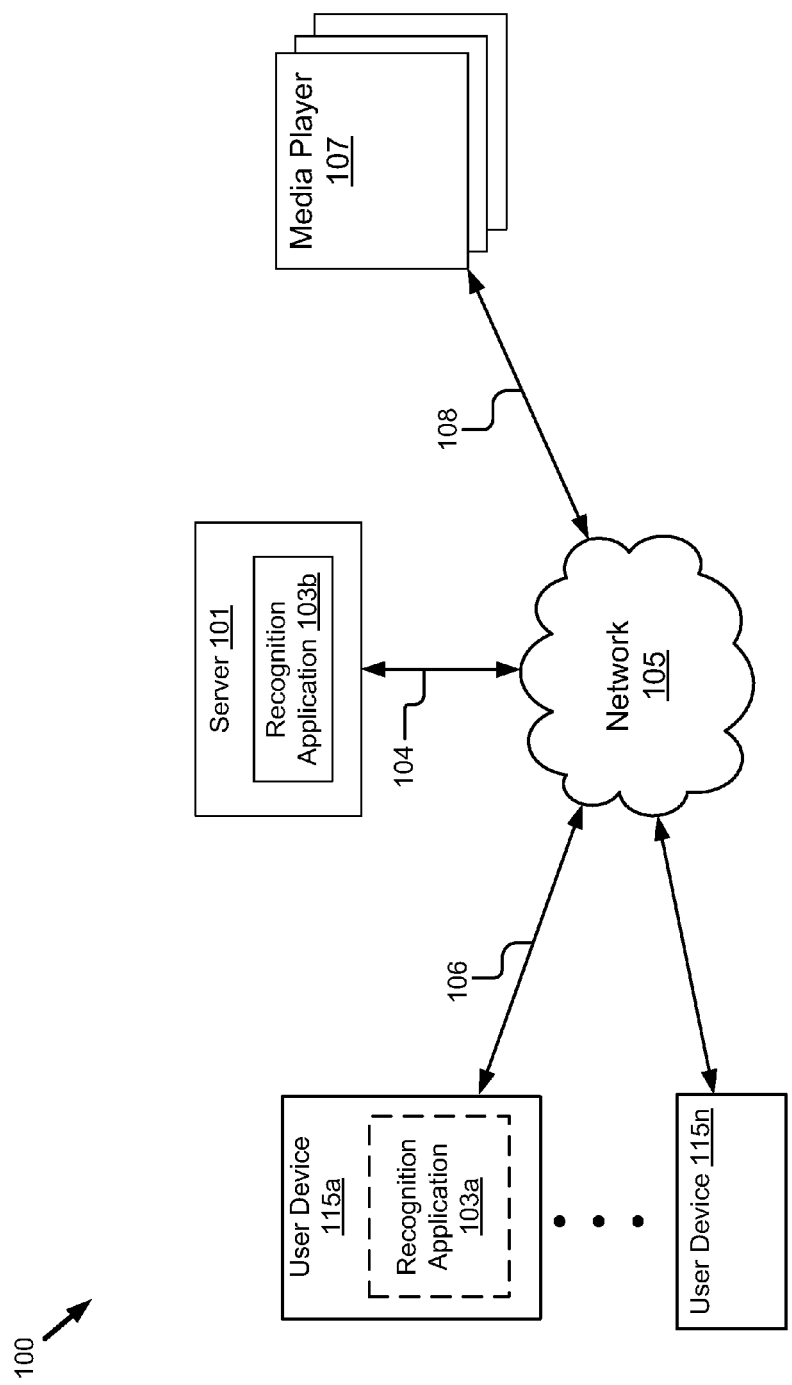
FIG. 1 is a high-level block diagram illustrating one embodiment of a system for identifying discussion groups related to a video that a user would find to be interesting.

A system and method for identifying discussion groups related to a video that a user would find to be interesting. In the following description, for purposes of explanation, numerous specific details are set forth in order to provide a thorough understanding of the invention is described. It will be apparent, however, to one skilled in the art that the embodiments can be practiced without these specific details. In other instances, structures and devices are shown in block diagram form in order to avoid obscuring the invention. For example, the invention is described in one embodiment below with reference to user devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O processing units.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for identifying discussion groups related to a video that a user would find to be interesting. The illustrated system 100 includes a server 101, a media player 107 and user devices 115a . . . 115n that can be accessed by users and the server 101. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or includes portions of a telecommunications network for sending data in a variety of different communication protocols. In some embodiments, the network 105 includes Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the user device 115 and the server 101, in practice one or more networks 105 can be connected to these entities.

A user device 115a, 115n can be a computing device that includes a memory, a processor and a camera. For example, the user device 115 can be a laptop computer, a desktop computer, a tablet computer, a mobile telephone, a personal digital assistant (PDA), a mobile email device, a digital set top box (STB), digital video recorder (DVR), connected television, etc. In some embodiments, the camera is a high resolution camera. The user device 115a, 115n is connected to the network 105, for example, 115a is connected to the network 105 via signal line 106. In some embodiments, the user device 115 is adapted to send and receive data to and from the server 101 via the network 105. In other embodiments, the user device 115 also receives data from the media player 107.

The media player 107 is an electronic device that displays media content and is coupled to the network 105 via signal line 108. For example, the media player 107 can be a television that displays broadcast TV programs or an application server that plays streaming videos. The user device 115a receives instructions from a user that is watching the media content played on the media player 107, captures an image from the media content and transmits the image to the server 101. The server 101 identifies a discussion group based on the image and provides the user device 115a with information associated with the discussion group.

In some embodiments, there are multiple media players 107 that each plays media content received from different sources (e.g., websites, video stores, etc.). In some examples, the media content from different sources is played on different media players 107. In other examples, the media content is received and played by the same media player 107.

In some embodiments, the recognition application 103a is stored on a user device 115a. In one example, the recognition application 103a is a thin-client application that includes part of the recognition application 103 on the user device 115a and part of the recognition application 103 on the server 101 to identify discussion groups related to a video that the user would find to be interesting.

In other embodiments, the recognition application 103b is operable on the server 101. The server 101 can be a computing device that includes a processor, a memory and network communication capabilities. The server 101 is coupled to the network 105 via signal line 104. The server 101 sends and receives data to and from other entities (e.g., the user device 105) of the system 100 via the network 105. Although only one server 101 is shown, persons of ordinary skill in the art will recognize that multiple servers can be present.

In one embodiment, the recognition application 103 can be implemented using hardware including a field-programmable gate array (FPGA) or an application-specific integrated circuit (ASIC). In another embodiment, the recognition application 103 can be implemented using a combination of hardware and software.

In one embodiment, the recognition application 103 receives a captured image from the user device 115. The captured image is from media. For example, the captured image is a screen shot of a show about single women living in New York City. The recognition application 103 identifies a source for each image and determines a timestamp associated with each image in a video. For example, the recognition application 103 determines that the image is from 1:00:24 of the television show Friends. A database indexes each image based on, for example, image features. The database also indexes an image including products and product category. For the above example, the database indexes Rachel's necklace identified from the image at 1:00:24 in a Jewelry category.

Once the images are indexed, they can be used as the basis for a social network where users can receive suggestions for discussion groups that the user would find to be interesting. In one embodiment, the recognition application 103 receives captured images from user devices 115, identifies indexed images that match the captured images and generates segments within a video based on a frequency of captured images as a function of time. For example, the recognition application 103 generates segments from the infamous Friends Episode "The One Where Ross and Rachel Take a Break." The segments can be based on clustering of images as a function of time. For example, where the captures form a bell curve, statistical analysis can be used to generate the boundaries of the segment.

The recognition application 103 generates a user profile for a first user. The user profile includes basic information about the first user including demographic information and is updated with information about the types of images the first user captures and discussion groups the first user has joined and/or participated in.

The recognition application 103 receives a captured image from the first user and identifies an indexed image and a timestamp that matches the captured image. Continuing with the above example, the captured image is of Ross and Rachel in Rachel's bedroom where Ross is in the middle of yelling "We were on a break!" The recognition application 103 determines a segment in the video that matches the captured image, and determines whether the first user is interested in the segment of the video based on the timestamp and the user profile. For example, if the first user historically talks about television shows generally, the first user might be less interested in discussing that particular segment. The recognition application 103 then provides suggested discussion groups to the first user that are ranked based on what the first user is interested in. For example, the recognition application 103 might suggest a first discussion group about Friends, a second discussion group about the particular segment, and a third discussion group about Season 3 of Friends.

The recognition application 103 receives captured image from a user device, identifies an indexed image that matches the captured image, identifies a timestamp for the indexed image, determines a segment in a video that encompasses the timestamp and provides a suggested discussion group to the user device based on the segment. The recognition application 103 is described below in more detail with reference to FIG. 2.

In some embodiments, the recognition application 103 generates segments within the video based on a frequency of captured images as a function of time or based on image features. In some embodiments, the recognition application 103 captures a source of the captured image and determines the timestamp of the captured image in the video is determined. Each image associated with the video is indexed. In some embodiments, the recognition application 103 identifies products from each image, product categories are determined for the products and indexing each image associated with the video includes indexing the products in each image according to the product categories. In some embodiments, the recognition application 103 generates the user profile for the first user, wherein the user profile includes at least one of the group of user demographics, user interests and metadata associated with the captured image. The recognition application 103 determines a collection of advertisements based at least in part on the user profile.

Recognition Application

Figure 2:
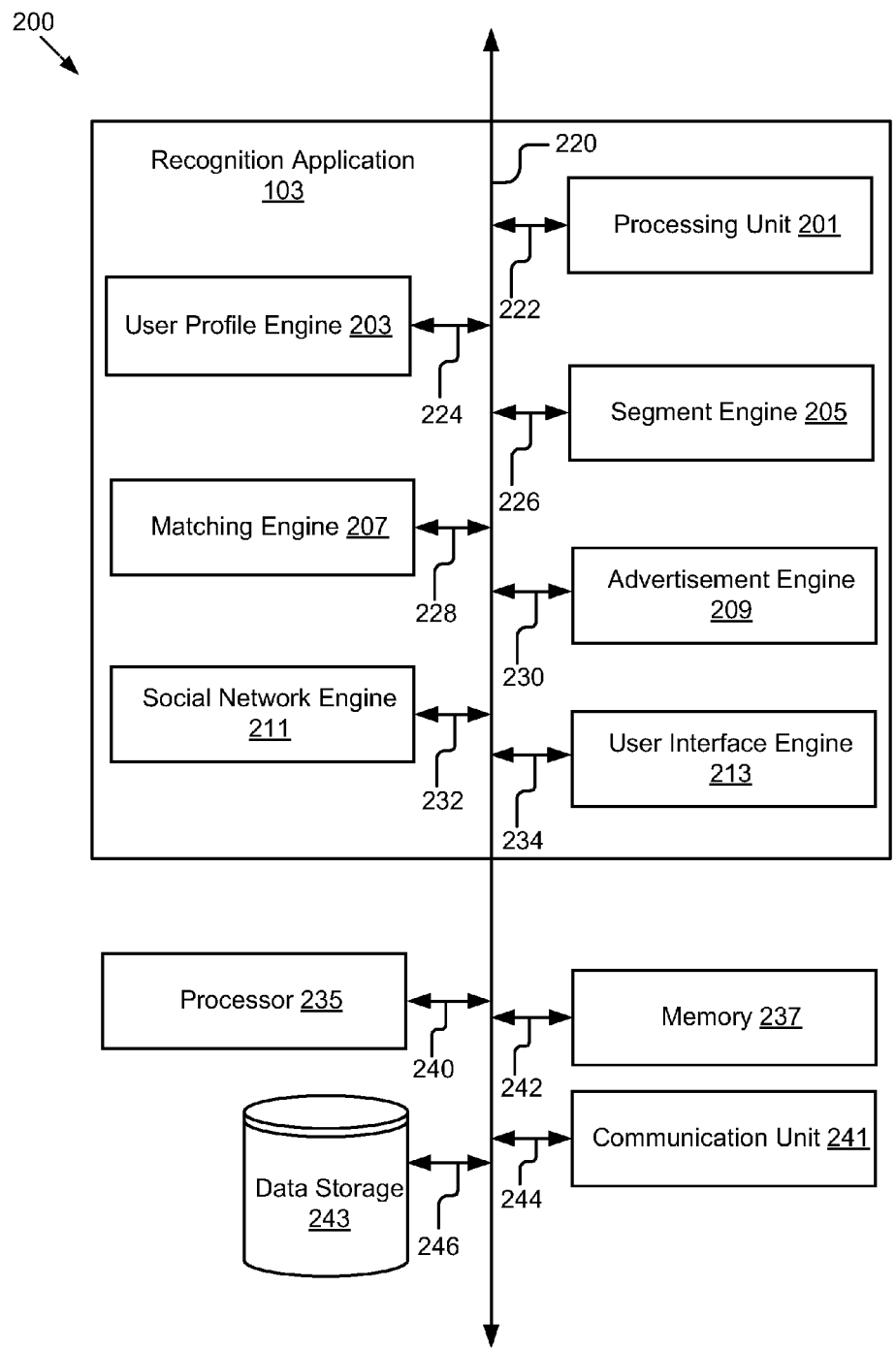
FIG. 2 is a block diagram illustrating one embodiment of a recognition application.

Referring now to FIG. 2, an example of the recognition application 103 is shown in more detail. FIG. 2 is a block diagram of a computer device 200 that includes a recognition application 103, a processor 235, a memory 237, a communication unit 241 and data storage 243 according to some examples. In one embodiment, the computing device 200 is a server 101. In another embodiment, the computing device 200 is a user device 115a. The components of the computing device 200 are communicatively coupled by a bus 220. The bus 220 may represent one or more buses including an industry standard architecture (ISA) bus, a peripheral component interconnect (PCI) bus, a universal serial bus (USB), or some other bus known in the art to provide similar functionality.

The processor 235 includes an arithmetic logic unit, a microprocessor, a general purpose processing unit or some other processor array to perform computations and to optionally provide electronic display signals to a display device. The processor 235 is coupled to the bus 220 for communication with the other components via signal line 240. The processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that can be executed by the processor 235. The memory 237 is coupled to the bus 220 for communication with the other components via signal line 242. The instructions and/or data may include code for performing the techniques described herein. The memory 237 may be a dynamic random access memory (DRAM) device, a static random access memory (SRAM) device, flash memory or some other memory device known in the art. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 241 is hardware for receiving and transmitting data by linking the processor 235 to the network 105 and other processing systems. The communication unit 241 receives data such as an image from the user device 115 and transmits the data to the processing unit 201. The communication unit 241 also transmits data including information associated with a discussion group to the user device 115 for display. The communication unit 241 is coupled to the bus 220 via signal line 244. In one embodiment, the communication unit 241 includes a port for direct physical connection to the user device 115 or to another communication channel. For example, the communication unit 241 includes an RJ45 port or similar port for wired communication with the user device 115. In another embodiment, the communication unit 241 includes a wireless transceiver (not shown) for exchanging data with the user device 115 or any other communication channel using one or more wireless communication methods, such as IEEE 802.11, IEEE 802.16, Bluetooth® or another suitable wireless communication method.

In yet another embodiment, the communication unit 241 includes a cellular communications transceiver for sending and receiving data over a cellular communications network such as via short messaging service (SMS), multimedia messaging service (MMS), hypertext transfer protocol (HTTP), direct data connection, wireless application protocol (WAP), e-mail or another suitable type of electronic communication. In still another embodiment, the communication unit 241 includes a wired port and a wireless transceiver. The communication unit 241 also provides other conventional connections to the network 105 for distribution of files and/or media objects using standard network protocols such as TCP/IP, HTTP, HTTPS and SMTP as will be understood to those skilled in the art.

The data storage 243 is a non-transitory memory that stores data for providing the functionality described herein. The data storage 243 may be a dynamic random access memory (DRAM) device, a static random access memory (SRAM) device, flash memory or some other memory devices. In some embodiments, the data storage 243 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. In the illustrated embodiment, the data storage 243 is communicatively coupled to the bus 220 via signal line 246.

In one embodiment, the data storage 243 includes a database. The database indexes images of a video. The video includes a number of frames at a frame rate. Each frame represents an image of the video. For example, for a 10-minute conversation show that includes 900 frames/images and a 10-minute short movie that includes 1500 frames/images (e.g., the conversation show has a lower frame rate than the short movie), the database indexes the 900 images and 1500 images, respectively. The frames are associated with metadata that can include channel name and genre; show name, episode and genre; objects and people in the frame; soundtrack information; mood and/or context of a frame (e.g. serious, sarcastic, action, comedy, romance, etc.); data on the frame (e.g. match score, stock data); scene and/or plot details (e.g. red wedding, killing of a central character, etc.); content information (e.g. movie director, actor, singer, location where video was shot, etc.); whether the broadcast is on air, live or a repeat; advertisement information; and a timestamp including the date.

The database stores the indices and retrieves the indices in response to receiving a query. In another embodiment, the images are from the print media 109. In one embodiment, each frame of a video is indexed. In another embodiment, unique frames of a video are indexed. For example, the database indexes images when there is a threshold difference between frames, such as a video of a person walking as opposed to a five second still shot of an object. Persons of ordinary skill in the art will recognize that many different types of indexing techniques are possible.

In one embodiment, the database indexes images using, for example, at least one of a video identifier (ID), an image ID and a position of the image in the video. The video ID can be a name of a movie, a date of daily news, or an indication showing which season and which episode that a video is in a series of TV shows. The image ID can be a title of the image such as "Ryan is looking at his mother," "Ryan is smiling," etc. The position of the image can be an ordinal number indicating the image's position (e.g., the first image, the second image . . . ) or a timestamp of the image in the video (e.g., the image captured at 0:40:25). The database additionally stores information about the images and the video, for example, an image size, a video size, a resolution, a color style (e.g., black-white, colored), etc. In another embodiment, the database also indexes an image based on image features (e.g., texture, edges, background colors, face features, etc.). Those skilled in the art will recognize that the database can use any features that are extracted from an image to index the image.

In another embodiment, the database indexes products in the images. For example, the database indexes a mountain bike and a bottle of juice in an image. The database also indexes products in the images according to product categories. For example, in the above example, the database indexes the mountain bike in a bike category and indexes the bottle of juice in a drink category.

In one embodiment, the recognition application 103 comprises a processing unit 201, a user profile engine 203, a segment engine 205, a matching engine 207, an advertisement engine 209, a social network engine 211 and a user interface engine 213. The components of the recognition application 103 are communicatively coupled via the bus 220.

The processing unit 201 can be software including routines for handling communications between the recognition application 103 and other components of the computing device 200. In one embodiment, the processing unit 201 can be a set of instructions executable by the processor 235 to provide the functionality described below for handling communications between the recognition application 103 and other components of the computing device 200. In another embodiment, the processing unit 201 can be stored in the memory 237 of the computing device 200 and can be accessible and executable by the processor 235. In either embodiment, the processing unit 201 can be adapted for cooperation and communication with the processor 235 and other components of the computing device 200 via signal line 222.

In one embodiment, the processing unit 201 receives data from a user device via the communication unit 241 and processes the data. The data includes an image captured from media. For example, a user accessing the user device 115 captured an image from a video played on the media player 107 in the middle of watching the video. The captured image is a screen shot of a piece of local news about a newly opened farmer market. The processing unit 201 identifies a source for the image and determines a timestamp associated with the image in the video. For example, the processing unit 201 identifies that the image is from this piece of local news and determines that the image is at 00:05:12 of the news. The processing unit 201 also identifies metadata associated with the image. For example, the processing unit 201 determines the time that the image was captured, a type of the image and the location of the user when the user was capturing the image. In one embodiment, the processing unit 201 receives each image associated with a video, identifies a source for each image and determines a timestamp associated with each image in the video. The processing unit 201 stores the images, the source and the timestamps in the data storage 243. The database included in the data storage 243 indexes the images based at least in part on the source and the timestamps. In another embodiment, the processing unit 201 also sends data to a user device via the communication unit 241. For example, the processing unit 201 receives graphical data for providing a user interface to a user from the user interface engine 213 and sends the graphical data to the user device 115 to cause the user interface displayed on the user device 115.

In another embodiment, the processing unit 201 receives data from other components of the recognition application 103 and stores the data in the data storage 243. For example, the processing unit 201 receives segments associated with a video from the segment engine 205 and stores the segments in the data storage 243.

In yet another embodiment, the processing unit 201 retrieves data from the data storage 243 and sends the data to other components of the recognition application 103. For example, the processing unit 201 retrieves indexed images of a video from the data storage 243 and sends the indexed images to the matching engine 207.

The user profile engine 203 can be software including routines for generating a user profile for a user. In one embodiment, the user profile engine 203 can be a set of instructions executable by the processor 235 to provide the functionality described below for generating a user profile for a user. In another embodiment, the user profile engine 203 can be stored in the memory 237 of the computing device 200 and can be accessible and executable by the processor 235. In either embodiment, the user profile engine 203 can be adapted for cooperation and communication with the processor 235 and other components of the computing device 200 via signal line 224.

The user profile engine 203 generates a user profile that includes basic information of a user, for example, a name (e.g., real life name, username, unique identifier, nickname, etc.), a photo, user demographics (e.g., age, gender, residence, language, etc.), user interests, etc. The user profile engine 203 determines the user interests based on user input (e.g., topics that the user is interested in, websites that the user subscribes to, etc.), social interactions (e.g., comments, posts or shares on a topic, electronic messages about a topic, browsing history, etc.) and other factors (e.g., types of images captured by the user). The user profile engine 203 also receives metadata associated with an image and generates a user profile for the user based on the metadata. For example, the user profile includes that the user captured an image in San Francisco at 6:00 pm. The user profile engine 203 identifies at least who captured the image, when the image was captured and where the image was captured from metadata associated with the image.

In one embodiment, the user profile engine 203 updates the user profile to reflect changes to user information. For example, the user profile engine 203 changes the types of images that the user captures in the user profile. As a result, the user profile engine 203 may also replace a first interest in the user profile with a second interest to accommodate the changes to the types of images. In another embodiment, the user profile engine 203 updates the user profile to include additional information. For example, the user profile engine 203 adds a discussion group that the user has recently joined in the user profile.

In one embodiment, the user profile engine 203 also determines whether a user is interested in a segment of a video based at least in part on the user profile. This process is described below in more detail with reference to the social network engine 211.

The segment engine 205 can be software including routines for generating segments within a video. In one embodiment, the segment engine 205 can be a set of instructions executable by the processor 235 to provide the functionality described below for generating segments within a video. In another embodiment, the segment engine 205 can be stored in the memory 237 of the computing device 200 and can be accessible and executable by the processor 235. In either embodiment, the segment engine 205 can be adapted for cooperation and communication with the processor 235 and other components of the computing device 200 via signal line 226.

In one embodiment, the segment engine 205 generates segments within a video based on a frequency of captured images as a function of time. A segment is a portion of the video that includes at least one image. The processing unit 201 receives images captured from the video, determines a timestamp associated with each image in the video and sends the images and associated timestamps to the segment engine 205. The segment engine 205 determines a frequency of images by counting how many times each image at each timestamp of the video is captured by users. The frequency is a function of time. For example, the segment engine 205 receives images from the first episode of the movie Star Explosion and determines that frequency values at the first five seconds of the movie are two, one, ten, one and three. The segment engine 205 clusters captured images as a function of time based on the frequency and generates segments for the video based on the clusters. For example, the segment engine 205 clusters a two-minute time period of the video based on each of the frequency values within this two minutes being less than a first threshold and determines the video at this two-minute time period as a first segment. The lower the first threshold, the fewer images the first segment contains and correspondingly the less interesting the first segment is to users. Similarly, the segment engine 205 can also cluster a five-minute time period based on each of the frequency values within this time period being greater than a second threshold and determines the video at this five-minute time period as a second segment. The higher the second threshold, the more images the second segment contains and correspondingly the more interesting the second segment is to users. Those skilled in the art will recognize that other statistical methods for determining the frequency are possible, such as a histogram determined based on frequency values at each timestamp of the video and a total number of captured images can be used to generate boundaries of a segment.

In another embodiment, the segment engine 205 receives features identified in captured images from a feature module (not shown) and generates segments within a video based on the features. The features include different types of information characterizing an image such as information about color, texture or edges of the image. For example, the segment engine 205 starts a segment with an image showing that a character in the video picks up a phone and ends the segment with an image showing that the character hangs up the phone.

The segment engine 205 also analyzes features associated with each image and determines boundaries of a segment of the video based on a significant change of the features. For example, the segment engine 205 determines that features associated with the first 20 images of the video include at least one of a girl and a toy and that the features associated with the images starting from the 21$^{st}$ image no longer include the girl or the toy. As a result, the segment engine 205 determines the first 20 images as a segment of the video. Those skilled in the art will recognize that other approaches can be used to determine segments of a video.

In one embodiment, the segment engine 205 stores the segments in the data storage 243. In another embodiment, the segment engine 205 sends segments defined for a video to the matching engine 207. In yet another embodiment, responsive to receiving an image and a timestamp of the image in a video from the matching engine 207, the segment engine 205 determines a segment in the video that encompasses the timestamp associated with the image. In this case, the segment engine 205 may send the segment encompassing the timestamp to the social network engine 211 to provide suggestions of a social platform.

The matching engine 207 can be software including routines for identifying an indexed image that matches a captured image. In one embodiment, the matching engine 207 can be a set of instructions executable by the processor 235 to provide the functionality described below for identifying an indexed image that matches a captured image. In another embodiment, the matching engine 207 can be stored in the memory 237 of the computing device 200 and can be accessible and executable by the processor 235. In either embodiment, the matching engine 207 can be adapted for cooperation and communication with the processor 235 and other components of the computing device 200 via signal line 228.

The matching engine 207 receives an image from the processing unit 201. The image is captured by a user using a user device from a video. The matching engine 207 identifies, from the database that stores indexed images, an indexed image that matches the captured image based on, for example, the source of the captured image, image features, etc. In one embodiment, a feature module (not shown) coupled to the matching engine 207 identifies the features from the images. For example, the matching engine 207 receives an image captured from a movie A. The features identified from the captured image include three objects (e.g., a lady, a cow and a bucket) and background colors (blue on the top and green in the bottom of the image). The matching engine 207 selects indexed images of the movie A from the database based on determining that the source of the image is from the movie A. The matching engine 207 then identifies, from the selected images, that an indexed image has the same objects and consistent background colors with the captured images and determines that the indexed image matches the captured image. In one embodiment, the matching engine 207 determines whether two images match each other based on determining whether features associated with the two images satisfies a threshold criterion. For example, if 85% of features in an indexed image match features in the captured image and the threshold is 80%, the matching engine 207 determines that the indexed image matches the captured image based on the actual match (85%) is greater than the threshold 80%. Those skilled in the art will recognize that other approaches can be used to determine an image match.

Once the indexed image that matches the captured image is identified, the matching engine 207 identifies a timestamp for the indexed image and retrieves the indexed image and the timestamp from the database. In one embodiment, the matching engine 207 identifies the metadata associated with the frames. For example, the matching engine 207 identifies channel name and genre; show name, episode and genre; objects and people in the frame; soundtrack information; mood and/or context of a frame (e.g. serious, sarcastic, action, comedy, romance, etc.); data on the frame (e.g. match score, stock data); scene and/or plot details (e.g. red wedding, killing of a central character, etc.); content information (e.g. movie director, actor, singer, location where video was shot, etc.); whether the broadcast is on air, live or a repeat; advertisement information; and a timestamp including the date. In some embodiments, the matching engine 207 adds the metadata to the user profile to show the types of things the user might be interested in, for example, action movies, the climax of episodes, basketball scores, etc. The matching engine 207 sends the indexed image and the timestamp to the segment engine 205 for determining a segment that encompasses the timestamp.

The advertisement engine 209 can be software including routines for identifying products in an image and determining product advertisements to serve a user. In one embodiment, the advertisement engine 209 can be a set of instructions executable by the processor 235 to provide the functionality described below for identifying products in an image and determining product advertisements to provide to a user. In another embodiment, the advertisement engine 209 can be stored in the memory 237 of the computing device 200 and can be accessible and executable by the processor 235. In either embodiment, the advertisement engine 209 can be adapted for cooperation and communication with the processor 235 and other components of the computing device 200 via signal line 230.

The advertisement engine 209 receives a captured image from the processing unit 201 and identifies products in the captured image. For example, the image could be of a woman holding a wine bottle. The advertisement engine 209 identifies the clothing and jewelry the woman is wearing (e.g. the dress is made by a clothing store, the necklace is from a boutique in New York City) and the wine bottle (e.g. the wine is produced by California winery). In one embodiment, the advertisement engine 209 also categorizes the products. For the above example, the advertisement engine 209 determines three categories of products: clothing, jewelry and wine.

Once the products are identified from the captured image, the advertisement engine 209 determines a collection of advertisements related to the identified products. The advertisements can include text, pictures, audio, video, links, maps, etc. For example, based on a diamond necklace determined from the image, the advertisement engine 209 generates a collection of advertisements including a picture of earrings that pair with the necklace, a link to the website of the boutique that sells the necklace, pictures of other diamond necklaces sold in the boutique, a map with the boutique in the center, etc.

The advertisement engine 209 personalizes the collection of advertisements based on user profiles and serves the personalized advertisements to a user. In one embodiment, the advertisement engine 209 generates the personalized advertisements about products identified from captured images. For example, the advertisement engine 209 identifies a brand of dress from an image in a video. The user profiles indicate that many of the users who captured this image live in Asia. Based on the location information, the advertisement engine 209 selects a series of clothes from this brand that are popular in Asia and provides this series of clothes to the users. In another embodiment, responsive to receiving an image captured from a video, the advertisement engine 209 communicates with the social network engine 211 to present the user a discussion group about the product, the image or the video. For example, the advertisement engine 209 sends the information of a coat identified in a captured image to the social network engine 211 to cause the social network engine 211 to identify a discussion group discussing the brand of the coat and to present the discussion group to the user.

In yet another embodiment, the advertisement engine 209 targets a group of customers from user profiles associated with the users who captured images from a video and generates advertisements for the targeted group. For example, the advertisement engine 209 determines that a group of people who live in Bangalore and who are in the age group 20-30 like to take screenshots from a famous American situational comedy and therefore generates advertisements about other American situational comedies that may be interesting to young people in India.

The social network engine 211 can be software including routines for providing suggested discussion groups. In one embodiment, the social network engine 211 can be a set of instructions executable by the processor 235 to provide the functionality described below for providing suggested discussion groups. In another embodiment, the social network engine 211 can be stored in the memory 237 of the computing device 200 and can be accessible and executable by the processor 235. In either embodiment, the social network engine 211 can be adapted for cooperation and communication with the processor 235 and other components of the computing device 200 via signal line 232.

In one embodiment, the processing unit 201 receives a captured image from a user. The matching engine 207 identifies an indexed image and a timestamp that matches the captured image. The segment engine 205 determines a segment in the video that encompasses the captured image. The user profile engine 203 determines whether the user is interested in the segment of the video. The social network engine 211 generates a social network where the user can receive suggestions for discussion groups that the user would find to be interesting. The social network engine 211 generates user profiles for users, discussion groups for discussing topics, forums for the discussion groups where users can create posts, comment, share content, generate polls, etc.

Once a segment in a video that encompasses a first image captured by a user is identified, the user profile engine 203 determines whether the user is interested in this particular segment based on the timestamp associated with the first image and the user profile associated with the user. In one example, the user captured a couple of images including the first image from the video in a short time frame. The user profile engine 203 determines that at least a second image (or a number of images that exceeds a threshold) is within the same segment based on the timestamps associated with the images. The user profile engine 203 determines that the user is interested in discussing the segment encompassing the first and second images. In another example, the user captured images of a cat from a cartoon. The cartoon is one-hour long and the cat is present in different segments of the cartoon for a total of five minutes. The captured images of the cat include a first image in a first segment and other images in other segments. Because the user focused on capturing images of the cat in a five-minute window from a one-hour long video, the user profile engine 203 determines that the user is more interested in the cat than other parts of the video, such as the topic of the video itself. As a result, the user profile engine 203 determines that the user may be interested in discussing all the segments encompassing the images of the cat including the first segment. In yet another example, when receiving an image captured from a television show by a user and determining that the user has historically talked about the show generally, the user profile engine 203 determines that the user would like to talk about the show generally more than discussing the segment encompassing the image.

Based on the determination about whether a user is interested in a segment of a video received from the user profile engine 203, the social network engine 211 ranks discussion groups and provides suggested discussion groups to the user based on the rankings. A first discussion group may have a specific topic about content in a segment or a particular scene in a segment. A second discussion may have a general topic about an entire video (e.g., Episode 5 of Friends, Star Explosion I) or a full season of a video (e.g., Season 4 of Friends, a series of Star Explosion). The social network engine 211 provides suggested discussion groups to the user that are ranked based on what the user is interested in. For example, based on a determination that a user wants to talk about "Friends" generally more than talking a segment of Friends, the social network engine 211 may suggest a first discussion group about Friends and a second discussion group about the particular segment, and present the two discussion groups to the user in this order. In another example, the user profile engine 203 determines that a user is interested in a first segment encompassing an image of a cat. The user profile engine 203 determines that the user may also be interested in a second segment and a third segment that encompasses images of the same cat. Between the second and third segments, the user profile engine 203 determines that the user is more interested in the second segment since the second segment is closer to the time span for the first segment than the third segment. The social network engine 211 suggests first, second and third discussion groups about the first, second and third segments respectively, and provides the user with a list containing the first discussion group on the top, the second discussion group in the middle and the third discussion group in the bottom. In some embodiments, the social network engine 211 weights other factors for the discussion groups, such as the time elapsed since a group was last active. As a result, the social network engine 211 may suggest a first discussion group to the user that is less interesting to the user above a second discussion group that has been inactive for a long time. Other weighting factors are possible, such as a number of participants. For example, a group with a larger number of participants could be weighted higher than a group with a smaller number of participants.

The social network engine 211 suggests discussion groups about a particular segment of a video. For example, movies could be categorized as having segments that include action, comedy, romance, etc. The social network engine 211 not only provides a discussion group for users commenting on the movie as a whole but also provides a different discussion group for users to interact on each of these specific moods or to comment and poll on specific characters in the movie. If the social network engine 211 provides a social platform related to different segments of a match, users who snap images of the match while watching the match on TV can socialize on specific events such as polling on penalty misses at a time interval or predicting score-lines at different time intervals.

In one embodiment, the social network engine 211 synchronizes discussion groups based on social activities that occurred in one of the discussion groups. For example, the social network engine 211 provides a user with a first discussion group about a segment of a movie and a second discussion group about the whole movie. After the user adds a comment about a particular scene in the first discussion group, the social network engine 211 will synchronize the second discussion group by adding the comment to the second group. In another embodiment, the social network engine 211 provides a discussion group about a video (e.g., a show) that can be activated only when the show is on air/live. In this way, the social network engine 211 provides exclusive social interaction to users who are currently watching the show.

The user interface engine 213 is software including routines for generating graphical data for providing user interfaces to users. In one embodiment, the user interface engine 213 is a set of instructions executable by the processor 235 to provide the functionality below for generating graphical data for providing the user interfaces. In another embodiment, the user interface engine 213 is stored in the memory 237 of the computing device 200 and is accessible and executable by the processor 235. In either embodiment, the user interface engine 213 is adapted for cooperation and communication with the processor 235 and other components of the computing device 200 via signal line 234.

In one embodiment, the user interface engine 213 generates a graphical interface for a user of a user device 115 to capture an image of a video displayed on a media player 107. In another embodiment, the user interface engine 213 receives instructions from the social network engine 211 to generate graphical data for presenting information of discussion groups on a user device 115 for a user. In yet another embodiment, the user interface engine 213 generates a graphical image for displaying advertisements related to an image captured from a video.

Example Methods and Graphic Representations

Figure 3:
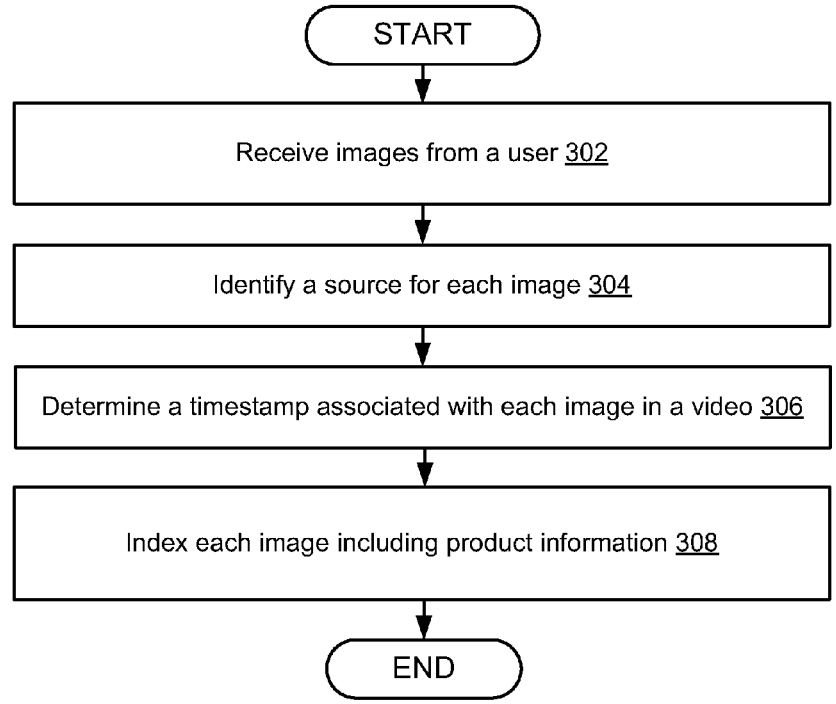
FIG. 3 is a flow diagram illustrating one embodiment of a method for indexing images of a video.

FIG. 3 is a flow diagram 300 of one embodiment of a method for indexing images of a video. The computing device 200 includes the recognition application 103 and data storage 243. The recognition application 103 includes a processing unit 201. The data storage 243 includes a database.

The processing unit 201 receives 302 images from users via the communication unit 241 and processes the data. The images are captured from media (e.g., a video). For example, the image is a screen shot of a piece of local news about a newly opened farmer market. The processing unit 201 identifies 304 a source for each image of the video and determines 306 a timestamp associated with each image in the video. For example, the processing unit 201 identifies that the image is from the piece of local news and determines that the image is at 00:05:12 of the news. The processing unit 201 stores the images, the source and the timestamps in the database.

The database indexes 308 each image including product information. In one embodiment, the database indexes images using, for example, at least one of a video identifier (ID), an image ID and a position of the image in the video. The database stores information about the images and the video, for example, an image size, a video size, a resolution, a color style (e.g., black-white, colored), etc. In another embodiment, the database also indexes an image based on image features (e.g., texture, edges, background colors, etc.). In yet another embodiment, the database indexes products in the images. For example, the database indexes a mountain bike and a bottle of juice in an image. The database also indexes products in the images according to product categories. For the above example, the database indexes the mountain bike in a bike category and indexes the bottle of juice in a drink category.

Figure 4:
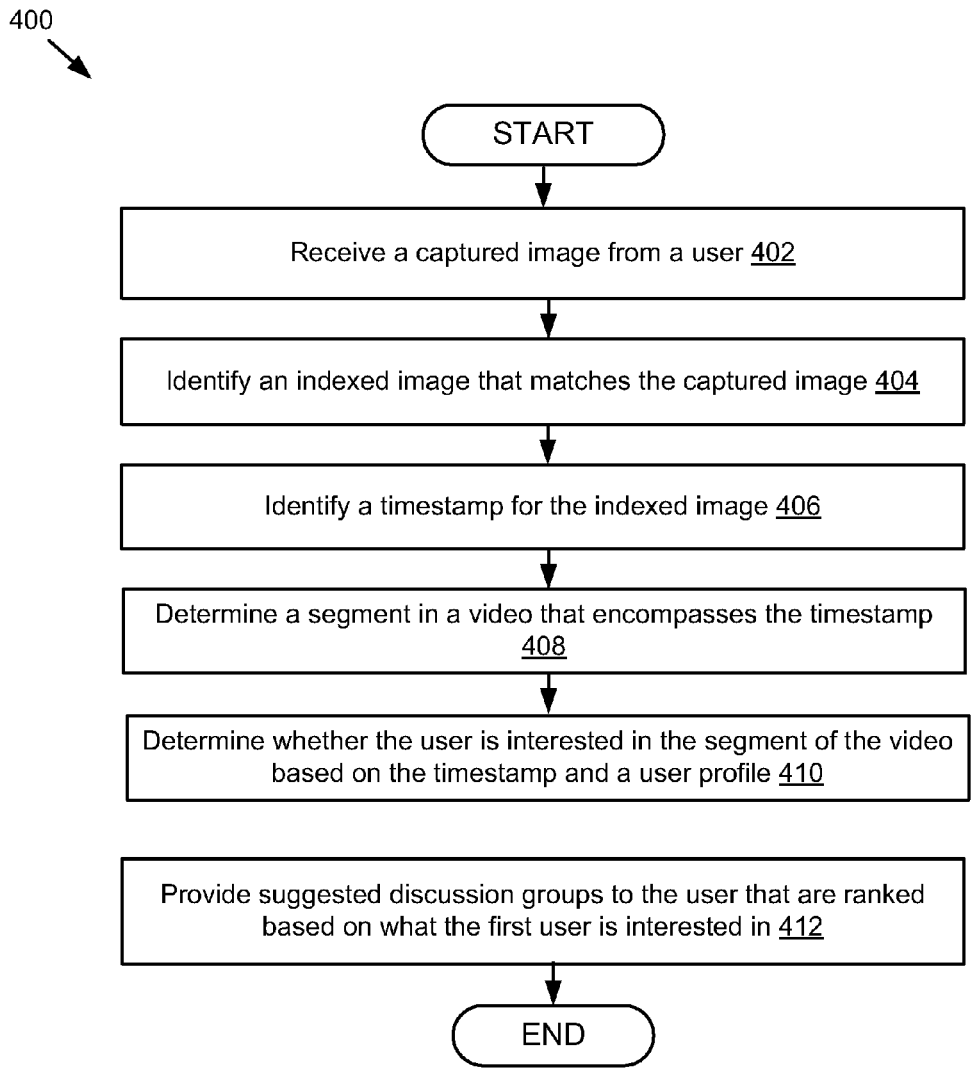
FIG. 4 is a flow diagram illustrating one embodiment of a method for identifying discussion groups related to a video that a user would find to be interesting.

FIG. 4 is a flow diagram 400 of one embodiment of a method for identifying discussion groups related to a video that a user would find to be interesting. The recognition application 103 includes a processing unit 201, a user profile engine 203, a segment engine 205, a matching engine 207 and a social network engine 211.

The processing unit 201 receives 402 a captured image from a user. The image is from media such as a movie or a streaming video. In some embodiments, the user profile engine 203 identifies a user associated with the captured image from metadata associated with the captured image stored in the user profile. The user profile engine 203 also identifies when and where the image was captured from the metadata.

The matching engine 207 identifies 404 an indexed image that matches the captured image. In one embodiment, the matching engine 207 identifies, from the database that stores indexed images, an indexed image that matches the captured image based on, for example, the source of the captured image, image features, etc. The matching engine 207 identifies 404 a timestamp for the indexed image. The matching engine 207 retrieves the indexed image and the timestamp from the database and sends them to the segment engine 205.

The segment engine 205 determines 408 a segment in a video that encompasses the timestamp. A segment is a portion of the video that includes at least one image. The segment engine 205 determines 410 whether the user is interested in the segment of the video based on the timestamp and a user profile. The segment engine 205 sends the segment encompassing the timestamp to the social network engine 211 and the social network engine 211 provides 412 suggested discussion groups to the user that are ranked based on what the first user is interested in. A first discussion group may have a specific topic about content in a segment or a particular scene in a segment. A second discussion may have a general topic about an entire video (e.g., Episode 5 of Friends, Star Explosion I) or a full season of a video (e.g., Season 4 of Friends, a series of Star Explosion). In one embodiment, the social network engine 211 ranks the discussion group about the video higher than the discussion group about the full season because the user profile indicates that the user consistently shows interest in more specific details like episodes and segments of episodes than a show in general.

Figure 5:
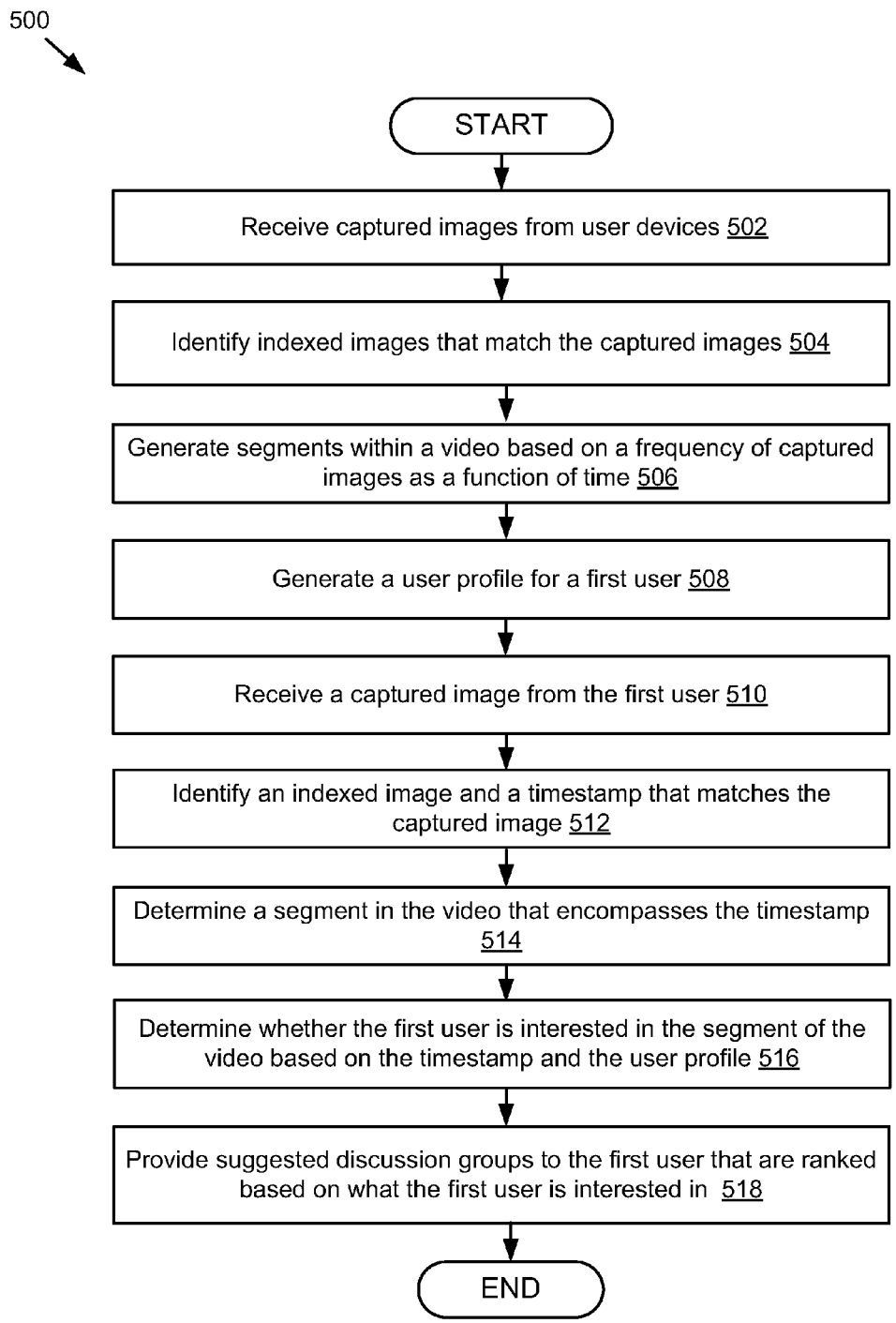
FIG. 5 is a flow diagram illustrating another embodiment of a method for identifying discussion groups related to a video that a user would find to be interesting.

FIG. 5 is a flow diagram 500 of another embodiment of a method for identifying discussion groups related to a video that a user would find to be interesting. The recognition application 103 includes a processing unit 201, a user profile engine 203, a segment engine 205, a matching engine 207 and a social network engine 211.

The processing unit 201 receives 502 captured images from user devices. The captured images are associated with a video. The processing unit 201 identifies a source for each image of the video and determines a timestamp associated with each image in the video. The processing unit 201 stores the images, the source and the timestamps in the data storage 243. The database included in the data storage 243 indexes the images based at least in part on the source and the timestamps.

The matching engine 207 identifies 504 indexed images that match the captured images based on, for example, the source of the captured images, image features, etc. For example, the matching engine 207 receives an image captured from a movie A. The features identified from the captured image include three objects (e.g., a lady, a cow and a bucket) and background colors (blue on the top and green in the bottom of the image). The matching engine 207 selects indexed images of the movie A from the database based on determining that the source of the image is from the movie A. The matching engine 207 then identifies, from the selected images, that an indexed image has the same objects and consistent background colors with the captured images and determines that the indexed image matches the captured image.

The segment engine 205 generates 506 segments within a video based on a frequency of captured images as a function of time. The segment engine 205 determines a frequency of images by counting the number of images at each timestamp in the video. The segment engine 205 clusters captured images as a function of time based on the frequency and generates segments for the video based on the clusters. For example, the segment engine 205 clusters a two-minute time period of the video based on each of the frequency values within this two minutes being less than a first threshold and determines the video at this two-minute time period as a first segment. The lower the first threshold, the fewer images the first segment contains and correspondingly the less interesting the first segment is to users. In one embodiment, the segment engine 205 also receives features identified in captured images from a feature module (not shown) and generates segments within a video based on the features.

The user profile engine 203 generates 508 a user profile for a first user. The user profile includes basic information of the first user, for example, a name (e.g., real life name, username, unique identifier, nickname, etc.), a photo, user demographics (e.g., age, gender, residence, language, etc.), user interests, etc. The user profile engine 203 determines the user interests based on user input (e.g., topics that the first user is interested in, websites that the first user subscribes to, etc.), social interactions (e.g., comments, posts or shares on a topic, electronic messages about a topic, browsing history, etc.) and other factors (e.g., types of images captured by the first user). The user profile engine 203 also receives metadata associated with an image captured by the first user and generates the user profile based on the metadata. For example, the user profile includes that the user captured an image in San Francisco at 6:00 pm.

The processing unit 201 receives 510 a captured image from the first user. The matching engine 207 identifies 512 an indexed image and a timestamp that matches the captured image. The segment engine 205 determines 514 a segment in the video that encompasses the timestamp.

The user profile engine 203 determines 516 whether the first user is interested in the segment of the video based on the timestamp and the user profile. In one example, the first user captured a couple of images including a first image from the video in a short time. The user profile engine 203 determines that at least a second image (or a number of images that exceeds a threshold) is within the same segment based on the timestamps associated with the images. The user profile engine 203 determines that the first user is interested in discussing the segment encompassing the first and second images. In another example, when receiving an image captured from a television show by the first user and determining that the first user has historically talked about the show generally, the user profile engine 203 determines that the first user would like to talk about the show generally more than discussing the segment encompassing the image.

The social network engine 211 provides 518 suggested discussion groups to the first user that are ranked based on what the first user is interested in. For example, based on a determination that the first user wants to talk about Friends generally more than talking about a segment of Friends, the social network engine 211 may suggest a first discussion group about Friends and a second discussion group about the particular segment, and present the two discussion groups to the first user in this order. In another example, the user profile engine 203 determines that the first user is interested in a first segment encompassing an image of a cat. The user profile engine 203 determines that the first user may also be interested in a second segment and a third segment that encompass images of the same cat. Between the second and third segments, the user profile engine 203 determines that the first user is more interested in the second segment since the second segment is closer to the first segment in time than the third segment. The social network engine 211 suggests first, second and third discussion groups about the first, second and third segments respectively, and provides the first user a list containing the first discussion group on the top, the second discussion group in the middle and the third discussion groups at the bottom.

Figure 6:
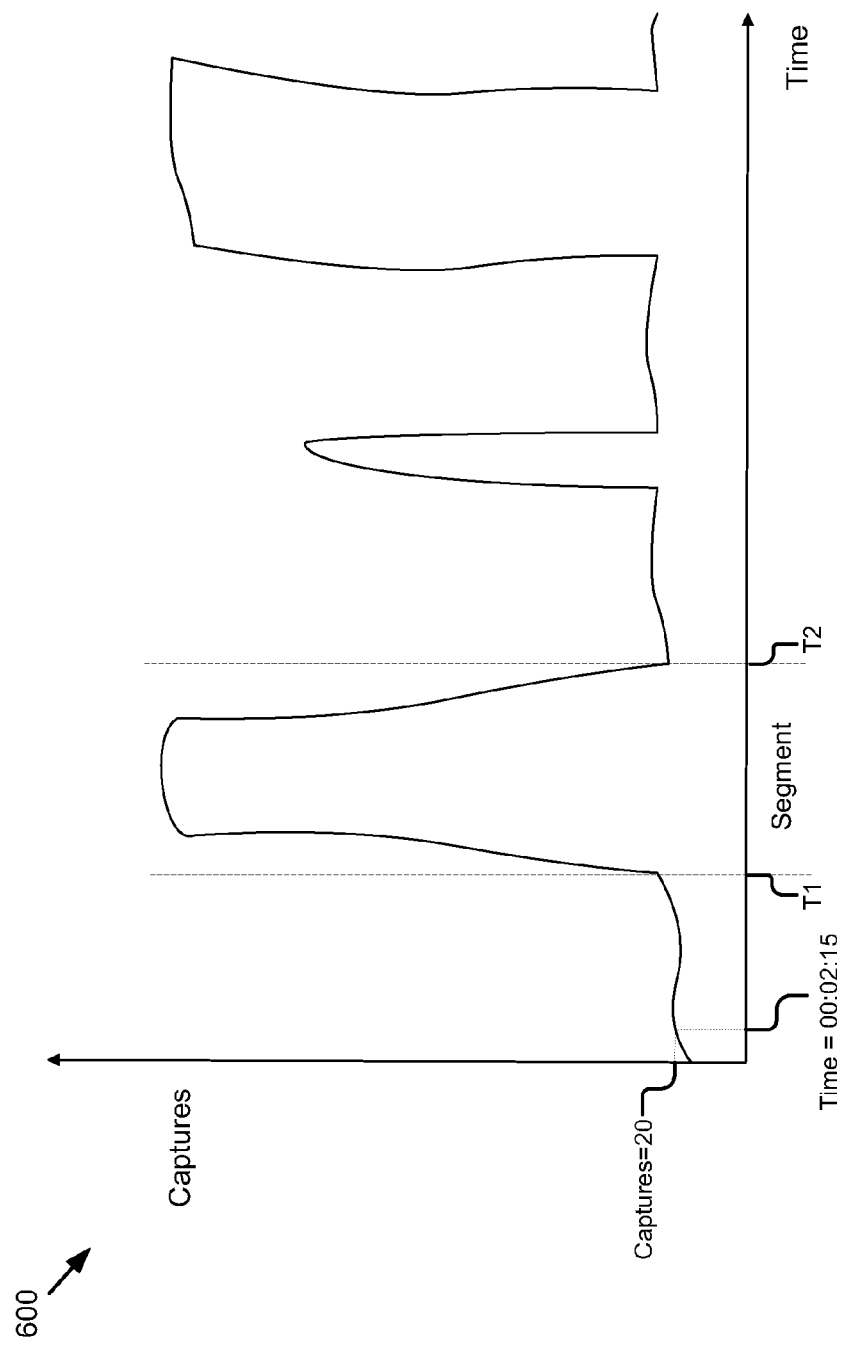
FIG. 6 is a graphical representation of example segments generated from a video.

FIG. 6 is a graphical representation 600 of an example segment generated from a video. The graphic representation 600 includes a plot illustrating the captured images as a function of time. The horizontal axis of the plot, denoted as "Time," indicates timestamps of a video. The vertical axis of the plot, denoted as "Captures," indicates a number of times that an image at a timestamp of the video is captured (e.g., a frequency of images). For example, the plot shows that the image at 00:02:15 of the video are captured 20 times. The segment engine 205 generates segments within a video based on the frequency of captured images as a function of time. For example, the segment engine 205 determines the video between T1 and T2 as a segment since the frequency values at this time period exceed a threshold.

Figure 7:
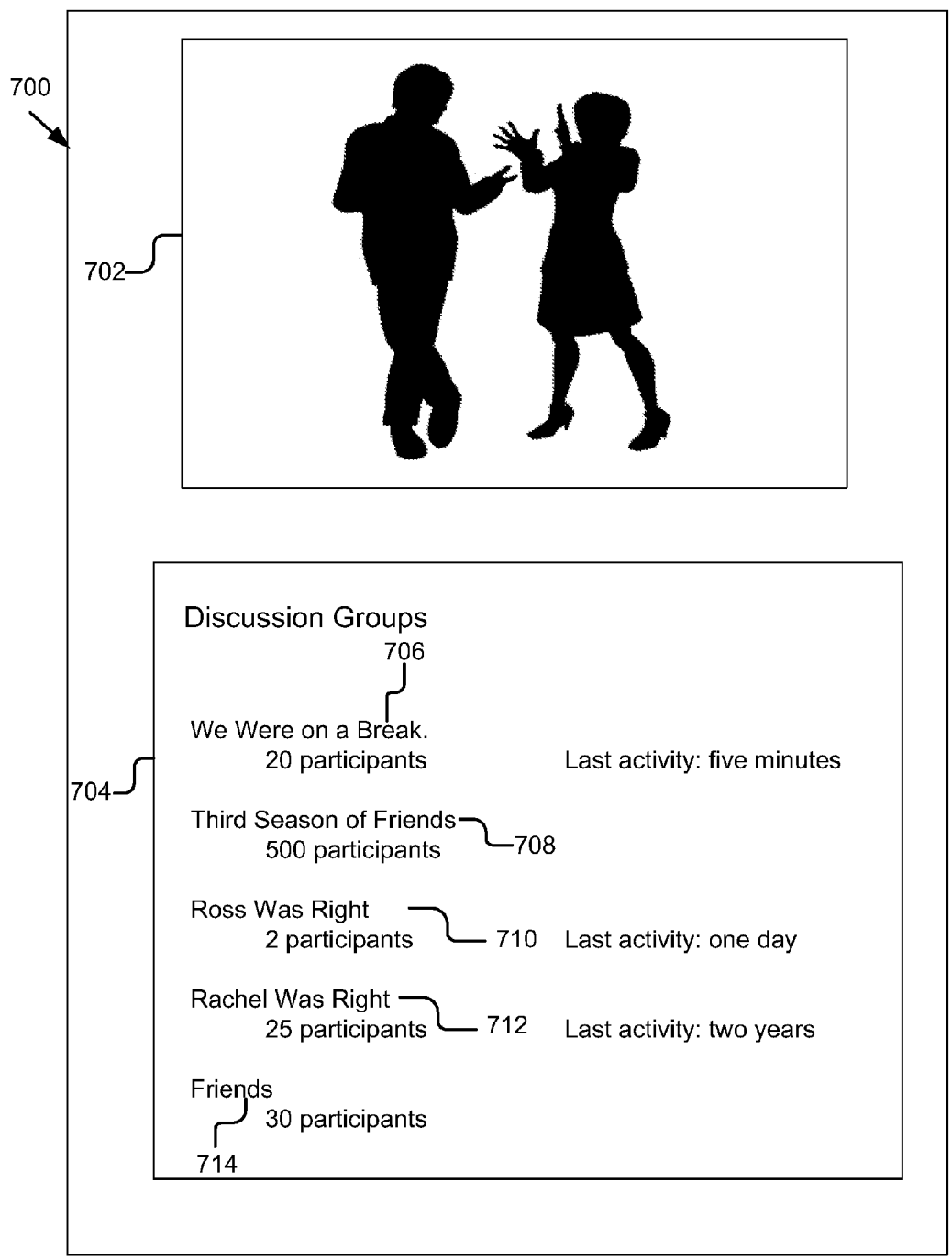
FIG. 7 is a graphical representation of example discussion groups related to a video.

FIG. 7 is a graphical representation 700 of example discussion groups related to a video. The graphic representation 500 includes an image 702 and a list of discussion groups 704. The image 702 is from the TV show Friends and is of Ross and Rachel in Rachel's bedroom where Ross is in the middle of yelling "We were on a break!" The processing unit 201 receives the image 702 that is captured by a user. The matching engine 207 identifies an indexed image and a timestamp that matches the image 702. The segment engine 205 determines a segment that encompasses the timestamp. The user profile engine 203 determines that the user is interested in discussing this particular segment. The social network engine 211 ranks discussion groups based on what the user is interested in and provides the ranked discussion groups to the user. In this example, the social network engine 211 communicates with the user interface engine 211 to display the discussion group 706 We Were on a Break on the top of the list since the user is interested in the segment that encompasses the image 702. The social network engine 211 also lists discussion groups 708, 710, 712 and 714 after the discussion group 706 since the user may be less interested in discussing this TV show generally than discussing the particular segment encompassing the image 702. For example, the discussion group 708 is about general discussion of the third season of Friends and the discussion group 714 is about general discussion of the whole series of Friends. In this example, the social network engine 211 determines that the user would be more interested in accessing the Rachel Was Right discussion group 712, but because it has been inactive for two years, the social network engine 211 ranks the Ross Was Right discussion group 710 higher in the list.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   receiving, with one or more processors, a captured image from a user;
   identifying, with the one or more processors, an indexed image that matches the captured image;
   identifying, with the one or more processors, a timestamp for the indexed image;
   determining, with the one or more processors, a segment in a video that encompasses the timestamp;
   determining, with the one or more processors, whether the user is interested in the segment of the video based on the timestamp and a user profile; and
   providing, with the one or more processors, suggested discussion groups to the user that are ranked based on what the user is interested in.

2. The method of claim 1, further comprising generating segments within the video based on a frequency of captured images as a function of time.

3. The method of claim 1, further comprising generating segments within the video based on image features.

4. The method of claim 1, further comprising:
   identifying a source of the captured image; and
   determining the timestamp of the captured image in the video.

5. The method of claim 1, further comprising indexing each image associated with the video.

6. The method of claim 5, further comprising:
   identifying products from each image;
   determining product categories for the products; and
   wherein indexing each image associated with the video includes indexing the products in each image according to the product categories.

7. The method of claim 1, further comprising generating the user profile for the user, wherein the user profile includes at least one of the group of user demographics, user interests and metadata associated with the captured image.

8. The method of claim 1, further comprising determining a collection of advertisements based at least in part on the user profile.

9. A system comprising:
   one or more processors;
   a processing unit stored on a memory and executable by the one or more processors, the processing unit configured to receive a captured image from a user;
   a matching engine coupled to the processing unit and configured to identify an indexed image that matches the captured image and identify a timestamp for the indexed image;
   a segment engine coupled to the processing unit and configured to determine a segment in a video that encompasses the timestamp;
   a user profile engine coupled to the processing unit and configured to determine whether the user is interested in the segment of the video based on the timestamp and a user profile; and
   a social network engine coupled to the user profile engine and configured to provide suggested discussion groups to the user that are ranked based on what the user is interested in.

10. The system of claim 9, wherein the segment engine is further configured to generate segments within the video based on a frequency of captured images as a function of time.

11. The system of claim 9, wherein the segment engine is further configured to generate segments within the video based on image features.

12. The system of claim 9, wherein the processing unit is further configured to identify a source of the captured image and determine the timestamp of the captured image in the video.

13. The system of claim 9, further comprising a database coupled to the processing unit and configured to index each image associated with the video.

14. The system of claim 13, further comprising an advertisement engine coupled to the processing unit and configured to:
   identify products from each image;
   determine product categories for the products; and
   wherein the database indexes each image associated with the video by indexing the products in each image according to the product categories.

15. The system of claim 9, wherein the user profile engine is further configured to generate the user profile for the user, wherein the user profile includes at least one of the group of user demographics, user interests and metadata associated with the captured image.

16. The system of claim 9, further comprising an advertisement engine coupled to the processing unit and configured to determine a collection of advertisements based at least in part on the user profile.

17. A computer program product comprising a non-transitory computer useable medium including a computer readable program, wherein the computer readable program when executed on a computer causes the computer to:
   receive a captured image from a user;
   identify an indexed image that matches the captured image;
   identify a timestamp for the indexed image;
   determine a segment in a video that encompasses the timestamp;
   determine whether the user is interested in the segment of the video based on the timestamp and a user profile; and
   provide suggested discussion groups to the user that are ranked based on what the user is interested in.

18. The computer program product of claim 17, wherein the computer readable program when executed on the computer further causes the computer to generate segments within the video based on a frequency of captured images as a function of time.

19. The computer program product of claim 17, wherein the computer readable program when executed on the computer further causes the computer to generate segments within the video based on image features.

20. The computer program product of claim 17, wherein the computer readable program when executed on the computer further causes the computer to index each image associated with the video.

* * * * *